United States Patent
Becker

(10) Patent No.: US 10,407,595 B2
(45) Date of Patent: Sep. 10, 2019

(54) FOAMED HOT MELT ADHESIVE COMPOSITION FOR BONDING PACKS OF CONTAINERS

(71) Applicant: H.B. Fuller Company, St. Paul, MN (US)

(72) Inventor: Christian Becker, Lueneberg (DE)

(73) Assignee: H.B. Fuller Company MN (US)

( * ) Notice: Subject to any disclaimer, the term of this patent is extended or adjusted under 35 U.S.C. 154(b) by 458 days.

(21) Appl. No.: 14/593,514

(22) Filed: Jan. 9, 2015

(65) Prior Publication Data
US 2015/0197671 A1    Jul. 16, 2015

Related U.S. Application Data

(60) Provisional application No. 61/925,763, filed on Jan. 10, 2014.

(51) Int. Cl.
| | | |
|---|---|---|
| *C09J 123/08* | (2006.01) | |
| *C08J 11/08* | (2006.01) | |
| *B65D 21/02* | (2006.01) | |
| *B32B 37/12* | (2006.01) | |
| *B32B 37/18* | (2006.01) | |
| *C09J 11/08* | (2006.01) | |
| *C09J 153/02* | (2006.01) | |

(52) U.S. Cl.
CPC ......... *C09J 123/08* (2013.01); *B32B 37/1207* (2013.01); *B32B 37/18* (2013.01); *B65D 21/0205* (2013.01); *C09J 11/08* (2013.01); *C09J 153/02* (2013.01); *B32B 2037/1215* (2013.01); *B32B 2439/00* (2013.01); *C09J 2201/61* (2013.01)

(58) Field of Classification Search
CPC ........ B32B 2037/1215; B32B 2439/00; B32B 37/1207; B32B 37/18; B65D 21/0205; C09J 11/08; C09J 123/08; C09J 153/02; C09J 2201/61
See application file for complete search history.

(56) References Cited

U.S. PATENT DOCUMENTS

| | | | |
|---|---|---|---|
| 3,902,992 A | | 9/1975 | Schuster |
| 4,059,714 A | * | 11/1977 | Scholl .................... B27G 11/00 |
| | | | 156/334 |
| 4,219,460 A | | 8/1980 | Donermeyer |
| 4,894,277 A | * | 1/1990 | Akasaki .............. B29C 44/1228 |
| | | | 156/79 |
| 5,076,430 A | | 12/1991 | Philpot |
| 6,582,829 B1 | | 6/2003 | Quinn et al. |
| 7,378,481 B1 | | 5/2008 | Gong |
| 2011/0213067 A1 | | 9/2011 | Moeller et al. |
| 2015/0037579 A1 | | 2/2015 | Juers et al. |

FOREIGN PATENT DOCUMENTS

| | | | |
|---|---|---|---|
| EP | 2826830 | * | 4/2015 |
| WO | WO 94/07967 | | 4/1994 |
| WO | WO 2006/031215 | | 3/2006 |
| WO | WO2009106466 | | 9/2009 |
| WO | WO 2012/139120 | | 10/2012 |
| WO | WO2013/004337 | | 1/2013 |
| WO | WO2013/004339 | | 1/2013 |
| WO | WO2013/004340 | | 1/2013 |
| WO | WO2013/004341 | | 1/2013 |
| WO | WO 2013/039263 | | 3/2013 |

OTHER PUBLICATIONS

Bit Nederland BV Brochure, "CompactAir".
Zhang, Z.X "The Status Quo and Development of Hot Melt Glue"; China Adhesives, vol. 3 No. 1, p. 47-53, Jan. 30, 1994. (Translated)

* cited by examiner

*Primary Examiner* — Yan Lan
(74) *Attorney, Agent, or Firm* — Kirsten Stone; Daniel Barta

(57) ABSTRACT

The present invention relates to a container pack comprising a plurality of containers, wherein the containers are bonded to each other with a foamed hot melt adhesive composition. In addition, the present invention also relates to the use of a foamed hot melt adhesive composition for bonding bundles of containers into packs.

20 Claims, No Drawings

FOAMED HOT MELT ADHESIVE COMPOSITION FOR BONDING PACKS OF CONTAINERS

This patent application claims the benefit of or priority to U.S. provisional application No. 61/925,763 filed on Jan. 10, 2014.

FIELD OF THE INVENTION

The present invention relates to a container pack comprising a plurality of containers, wherein the containers are bonded to each other with a foamed hot melt adhesive composition. In addition, the present invention also relates to the use of a foamed hot melt adhesive composition for bonding bundles of containers into packs.

BACKGROUND OF THE INVENTION

Hot melt adhesive compositions are well known in the art. Such hot melt adhesives are typically solid at room temperature and are applied to a substrate when molten, and then placed in contact with a second substrate. The adhesive cools and hardens to form a bond between the substrates. Hot melt adhesives are typically composed of at least two components: (a) a polymer; and (b) a tackifying agent. Optionally, various amounts of wax and plasticizer may further be employed. The polymer provides the formulation with its strength and adhesive characteristics. Typically, a thermoplastic polymer is used. The thermoplastic polymer may be selected from homopolymers, copolymers (e.g. interpolymers) or block copolymers. The tackifying agent allows the thermoplastic polymer to be more adhesive by improving wetting during the application. Tackifying agents are added to give tack to the adhesive and also to lower viscosity. Tack is required in most adhesive formulations to allow for proper joining of articles prior to the hot melt adhesive solidifying. One function of the wax component is to lower the viscosity of the hot melt adhesive. Low viscosity helps to lower application temperatures, provide cleaner processing, and also good wet out of the substrates. Furthermore, a low viscosity allows for liquefaction of the hot melt adhesive. In addition, due to the presence of the wax component, the hot melt adhesive crystallizes quickly which helps the material to harden or set quickly. Thus, the wax component also controls the open time and set speed of the system. The plasticizer also helps to lower viscosity and can additionally be used to impart permanent tack properties to the hot melt adhesive.

It is known in the art to use hot melt adhesives for bonding containers into packs. For example, WO 2013/004340 and WO 2013/004337 describe methods for producing packs of containers by bonding the containers to each other using an adhesive such as a hot melt adhesive. By directly bonding containers such as bottles using an adhesive, waste resulting from a shrink wrap with LDPE films on the bottle packs can be avoided. This also saves considerable amounts of energy since, for example, shrink wrapping involves six-packs being moved through a heating tunnel which uses large amounts of energy. Furthermore, a smaller packing line footprint and increased packing line speeds are possible. Also, the optical appearance of six-packs is improved, since undesirable creases in the shrink wrap are avoided. This is highly desirable, because beverage filling companies are especially serious about this. Generally, any secondary packaging of container packs, such as carton or cardboard cases or sheaths, plastic rings or sheaths, etc. can be avoided.

However, when using an adhesive such as a hot melt adhesive for directly bonding containers to each other, it is necessary to provide on the one hand a reliable bond between the containers. On the other hand, it is also required to ensure easy separation of the containers so that an individual container can be separated from the pack. Generally, a reliable bond can be provided by using a higher adhesive force, i.e. a stronger bond. By contrast, easy separation can be ensured by applying a lower adhesive force. Thus, providing simultaneously for a reliable bond and for easy separation represent conflicting goals. Thus, there remains a need in the art for containers reliably bonded to each other into packs, while at the same time being easily separable from each other.

SUMMARY OF THE INVENTION

It is an object of the present invention to provide a container pack comprising a plurality of containers reliably bonded to each other using an adhesive, while at the same time being easily separable from each other. It is a further object of the present invention to ensure a reliable bond between the containers and easy separation even when the adhesive is applied to the containers under cold and/or wet conditions. An additional object of the invention is to reduce or prevent the run-down of an adhesive after application to a container before bonding. Still another, object of the invention is to provide an adhesive with improved gap filling. Improved gap filling makes it possible for the adhesive to have improved bonding to uneven surfaces. These properties are particularly important for the use of hot melt adhesive compositions in the production of packs of containers such as bottles, wherein several bottles are glued together with a hot melt adhesive to form a bundle, for example a six-pack.

The present inventors have surprisingly found that the above objects can be achieved when a hot melt adhesive composition applied in the form of a foam is employed for bonding the containers. Thus, the present invention relates to a container pack comprising a plurality of containers, wherein the containers are bonded to each other with a foamed hot melt adhesive composition. In a preferred embodiment, the containers are bottles or cans. Suitable container materials include e.g. polyethylene terephthalate (PET), polyolefins, glass and metal. The containers can be of any size including but not limited to 500 milliliters (mls), 591 mls, 1.0 liter, 1.5 liter, etc. In a more preferred embodiment, the containers include PET bottles, preferably having a size of about 1.5 liter.

In principle, any hot melt adhesive composition is foamable and thus is suitable according to the invention. In preferred embodiments, the hot melt adhesive composition comprises: a) at least one polymer; and b) at least one tackifying resin. Optionally, various amounts of wax and plasticizer may also be included as desired.

Hot melt adhesive compositions in a wide viscosity range can be employed according to the invention. A person skilled in the art will be able adjust the application temperature as needed depending on the viscosity of a selected hot melt adhesive composition. Therefore, the hot melt adhesive composition has in a preferred embodiment a Brookfield viscosity at a temperature of 190° C. in the range from about 200 to about 13,000 mPa·s.

As noted above, the hot melt adhesive composition typically comprises at least one polymer, especially a thermoplastic polymer. In a preferred embodiment, the at least one polymer comprises at least one block copolymer. More preferably, the at least one block copolymer is included in an amount of about 5 to about 25 weight percent, based on the total weight of the hot melt adhesive composition, even more preferably in an amount of about 10 to about 20 weight percent.

In a further preferred embodiment of the invention, the hot melt adhesive composition applied in the form of a foam comprises:
a) from about 35 to about 60 weight percent of at least one homogenous linear or substantially linear interpolymer of ethylene and α-olefin;
b) from about 5 to about 25 weight percent of at least one block copolymer;
c) from about 25 to about 45 weight percent of at least one tackifying resin; and
d) less than 10 weight percent of at least one wax;
wherein the sum of components a), b) and c) amounts to at least 85 weight percent of the total adhesive composition, and
wherein the composition has a Brookfield viscosity at a temperature of 190° C. in the range from about 7,000 to about 12,000 mPa·s.

In addition, it is preferred according to the invention to select the at least one block copolymer from at least one of a diblock styrenic block copolymer, or a triblock styrenic block copolymer, more preferably styrene-ethylene/butylene-styrene (SEBS) or styrene-ethylene/propylene-styrene (SEPS).

The present invention also relates to the use of a foamed hot melt adhesive composition for bonding bundles of containers into packs. The hot melt adhesive composition is preferably foamed upon application with air or an inert gas, more preferably with nitrogen. Furthermore, the hot melt adhesive composition is foamed upon application to achieve a density reduction of preferably 25 to 50 percent, more preferably of 30 to 40 percent, compared to the hot melt adhesive composition applied without foaming. Additionally, the hot melt adhesive composition is in preferred embodiments foamed upon application to achieve a density of about 0.4 to about 0.8 grams (g)/milliliter (ml), more preferably about 0.5 to about 0.7 g/ml. Equipment for foaming and applying hot melt adhesive compositions is known in the art and is commercially available.

In a preferred embodiment the foamed hot melt adhesive composition is applied directly onto the containers such as bottles or cans. Preferably, 50 mg to 300 mg of foamed hot melt adhesive composition are applied to a container surface for bonding. Furthermore, the hot melt adhesive composition may in some embodiments be applied to wet containers. Additionally or alternatively, the hot melt adhesive composition in the form of a foam may be applied to cold containers e.g. having a temperature of 10° C. or less, preferably having a temperature of 6° C. or less.

As noted above, any hot melt adhesive in principle can be employed in accordance with the invention by providing a foam thereof. In preferred embodiments, the hot melt adhesive composition used for providing the foam is as defined in preferred embodiments described herein.

Further preferred embodiments of the present invention are defined by combination of the above described embodiments with the features of the dependent claims provided herein, set out below in detail.

The use of a foamed hot melt adhesive for bonding containers into packs on the one hand provides a reliable bond between the containers. In addition, the foaming of the hot melt adhesive avoids the run-down of the hot melt on the container after application. On the other hand, the use of a foamed hot melt adhesive composition surprisingly provides simultaneously for easy separation of the containers such as bottles, e.g. when the bottles are pulled apart by the consumer when beverages are consumed.

DETAILED DESCRIPTION OF THE INVENTION

In general, hot melt adhesives are thermoplastic compositions that are applied in a molten or flowable form. For many applications, hot melt adhesives are employed to bond two or more substrates while the adhesive is sufficiently molten. In other instances, the adhesive may be applied to a single substrate and cooled. The adhesive is subsequently bonded to a second substrate or surface with heat re-activation. For the purpose of the invention, "hot melt adhesive" refers to all such adhesive compositions.

The following abbreviations and definitions are used in the context of the present invention.

The undefined article "a" or "an" means one or more of the species designated by the term following said article. For example, "a particulate form" encompasses one or more particulate forms.

The term "about" in the context of the present application means a value within 15% (±15%) of the value recited immediately after the term "about," including any numeric value within this range, the value equal to the upper limit (i.e., +15%) and the value equal to the lower limit (i.e., −15%) of this range. For example, the phrase "about 100" encompasses any numeric value that is between 85 and 115, including 85 and 115 (with the exception of "about 100%", which always has an upper limit of 100%). A further exception is the phrase "about 0" or "about 0%", which always has a lower limit of 0 or 0%). In a preferred aspect, "about" means ±10%, even more preferably ±5%, even more preferably ±1% or less than ±1%.

The amount of a specific component, which is included in the hot melt adhesive composition may be defined as the weight per weight percentage as defined by the following ratio: weight %=(g of specific component)/(g of composition comprising specific components). For example, when 2.5 g of wax in 100 g of a hot melt adhesive are used, this results in a ratio of 2.5 weight % (2.5/100) of wax.

For the purpose of the present invention, the term "hot melt", "hot melt composition" or (hot melt adhesive composition" refers to a solvent free product which is substantially solid at room temperature, e.g. at a temperature between about 20° C. and about 25° C. When heated the hot melt becomes tacky and preferably liquid (molten) and can be applied, for example to a substrate to provide an adhesive surface.

The term "foamed" or "foam" refers according to the invention to materials including pockets of gas such as air or an inert gas such as nitrogen in a liquid or solidified hot melt adhesive composition. The pockets of gas may include open gas cells or closed gas cells. Foamed hot melt adhesives can be generated mechanically i.e. using commercially available equipment by contacting a flow of liquefied hot melt adhesive with a gas flow under pressure. In one embodiment, the gas such as air or an inert gas such as nitrogen is worked into the adhesive by two gear pumps running with different speeds relative to each other. Alternately, foamed hot melt adhesives can be generated chemically i.e. by use of chemical blowing agents or alternately water.

According to the invention, foamed hot melt adhesive compositions are used for bonding containers, based on e.g. PET, polyolefines, glass or metal, from which bottles or cans are typically made of, into packs. The containers can be of any size including but not limited to 500 ml, 591 ml, 1.0 liter, 1.5 liter, etc. In a preferred embodiment, the containers are PET bottles, e.g. having a size of 1.5 liter.

Foamed hot melt adhesive compositions are particularly suitable for bonding bundles of containers such as bottles or cans into packs, preferably six-packs. Methods for producing such packs or bundles with the use of adhesives are described for example in international patent applications WO 2013/004337 A1, WO 2013/004339 A1, WO 2013/004340 A1, and WO 2013/004341 A1, all incorporated herein by reference. The foamed hot melt adhesive composition can be applied directly onto the containers or bottles, on backing sheets between two groups of containers, or both, and allows separating the containers from groups in a non-destructive manner, for example when bottles or tins are pulled apart by the consumer when beverages are consumed.

For example, the use of a foamed hot melt adhesive composition for gluing two bottles to each other a typical procedure involves that the molten adhesive having a temperature of about 160° C. to about 200° C. is rapidly shot with a applicator allowing for the application of the hot melt in the form of a foam onto at least one bottle, e.g. onto opposing sides on two standing bottles (one shot takes approximately 50-100 milliseconds (ms)), e.g., at the bottom below the label and one on top in a spot where the two bottles touch each other; after about 2 seconds the bottles are combined and pressed together for about a few seconds, such as 5 seconds. A suitable applicator device includes e.g. a Compact Air hotmelt unit of BIT Nederland BV.

The particular application pattern may be varied as desired. For example, leaving out one or more adhesive spots for better bottle release from the pack can be envisaged, or more adhesive spots for large and heavy bottles.

Further, the adhesive composition can be varied to adjust properties such as separation force and bond strength.

Typically, the amount of adhesive used per shot varies from about 20 to about 300 mg/shot, usually at about 60 mg to about 300 mg/shot such as about 60 mg to about 150 mg/shot. Since such a process is dynamic, times and amounts may vary depending on the size and material of the containers such as bottles or cans and depending on the required ease of separation of the bottles upon use by the customer. In one embodiment, the foamed hot melt adhesive is applied to the containers so as to provide for a separation force of about 200 N or less, such as about 75 N to about 200 N, e.g. about 95 N to about 190 N.

Six packs or other desired pack sizes may be built up similarly, e.g. by gluing together pairs of bonded bottles, or by bonding bottles on backing sheets between two groups of bottles or containers, as described in the above mentioned international patent applications.

The foamed hot melt adhesives show good low temperature (for refrigeration) and high temperature (for shipping) resistance and are able to remain bonded when exposed to condensed water on the surface of the bottle. Also, the foamed adhesive compositions are flexible enough to allow bottle expansion during warming up when carbonized water or soft drinks are filled and glued together at low temperature such as 3° C. and bottle expansion occurs when the bottle warms up to room temperature. For example, bottle expansion of low temperature filled PET bottles can result in an extension in the range of 1-5 mm and the foamed hot melt adhesive of the invention allows this kind of force and keeps the bond closed.

The hot melt adhesive composition to be used for foaming is according to the present invention not specifically limited. Rather, any hot melt adhesive in principle can be foamed and thus can provide the advantages obtained according to the invention by foaming. In one embodiment, the hot melt adhesive is a Liquamelt™ adhesive available from HB Fuller Company (Saint Paul, Minn.). In another embodiment, the hot melt adhesive is a pressure sensitive adhesive. By pressure sensitive adhesive, it is meant that when cooled to room temperature the hot melt adhesive is tacky to the touch. Such a conventional hot melt adhesive compositions typically comprise (a) at least one polymer, and (b) at least one tackifying agent.

Suitable hot melt adhesive compositions may comprise the at least one polymer in an amount of 15 to 85 weight percent, based on the total weight of the hot melt adhesive composition. More preferably, the at least one polymer is comprised in the hot melt adhesive composition in an amount of 20 to 65 weight percent. The at least one polymer is not specifically limited with respect to the polymer being used. Rather, any polymer that in principle can be used in hot melt compositions is suitable according to the present invention. This refers to thermoplastic polymers selected, e.g., from ethylene and propylene homo- and copolymers and mixtures thereof. Examples are ethylene copolymers with vinyl acetate, n-butyl acrylate, n-hexyl acrylate, butene, octene, acrylic acid, and methacrylic acid. Also useful are amorphous poly-α-olefins such as atactic propylene, and propylene copolymers with ethylene, butene, hexene, and octene. Further useful polymers include polymers with a polydispersity (Mw/Mn) of less than about 5, in a preferred aspect less than about 3 (e.g. those manufactured with single site catalysts (e.g. metallocene catalyst). Such polymers include homopolymers and copolymers based on either ethylene or propylene. In addition, ethylene/α-olefin interpolymers or block copolymers as described in more detail below in connection with an illustrative preferred embodiment may be employed. Further, functionalized versions of any of the listed polymers may also be used, such as for example those functionalized with maleic anhydride.

In one embodiment, the at least one polymer comprises at least one block copolymer, e.g. in an amount of about 5 to about 25 weight percent, such as in an amount of about 10 to about 15 weight percent, based on the total weight of the hot melt adhesive composition. The at least one block copolymer may be selected e.g. from at least one of a diblock styrenic block copolymer, or a triblock styrenic block copolymer, or a combination of the two (sometimes triblock styrenic block copolymer includes a percentage of diblock) such as styrene-ethylene/butylene-styrene (SEBS) or styrene-ethylene/propylene-styrene (SEPS). Specific examples of suitable block copolymers are described below in connection with an illustrative preferred embodiment.

The hot melt adhesive composition further can comprise at least one tackifying agent e.g. in an amount of 5 to 60 weight %, based on the total weight of the hot melt adhesive composition, more preferably 20 to 60 weight %. The type of tackifying agent being used is not specifically limited. Rather, any tackifying agent that in principle can be employed in hot melt adhesive compositions can be used according to the present invention. Useful tackifying agents include, e.g., natural and modified rosins such as gum rosin, wood rosin, tall oil rosin, distilled rosin, hydrogenated rosin, dimerized rosin and polymerized rosin; rosin esters such as glycerol and pentaerythritol esters of natural and modified rosins including, e.g., glycerol esters of pale, wood rosin, glycerol esters of hydrogenated rosin, glycerol esters of polymerized rosin, pentaerythritol esters of hydrogenated rosin and phenolic-modified pentaerythritol esters of rosin;

phenolic modified terpene, alpha methyl styrene resins and hydrogenated derivatives thereof including, e.g., the resin product resulting from the condensation in an acidic medium of a bicyclic terpene and a phenol; aliphatic petroleum hydrocarbon resins having a Ball and Ring softening point of from about 70° C. to 135° C.; the latter resins resulting from the polymerization of monomers consisting primarily of olefins and diolefins; including hydrogenated aliphatic petroleum hydrocarbon resins; aromatic petroleum hydrocarbon resins, and mixed aromatic and aliphatic paraffin hydrocarbon resins and the hydrogenated derivatives thereof; aromatic modified alicyclic petroleum hydrocarbon resins and the hydrogenated derivatives thereof; alicyclic petroleum hydrocarbon resins and the hydrogenated derivatives thereof; low molecular weight polylactic acid; and combinations thereof.

The hot melt adhesive composition further can comprise at least one wax e.g. in an amount of 1 to 40 weight %, based on the total weight of the hot melt adhesive composition. For example, the at least one wax may be included in an amount of 1 to 25 weight %, or even in an amount of 1 to 10 weight %. Useful waxes include e.g. paraffin waxes, microcrystalline waxes, Fischer-Tropsch waxes, oxidized Fischer-Tropsch waxes, polyethylene and by-products of polyethylene wherein $M_w$ is less than 3000, propylene waxes and functionalized versions thereof. Additional functionalized waxes include waxes such as hydroxy stearamide and fatty amide waxes. Also suitable are ultra-low molecular weight ethylene/alpha-olefin interpolymers prepared using a constrained geometry (e.g. metallocene) catalyst, which may be referred to as homogeneous waxes.

Useful hot melt adhesive compositions can be plasticizer free. Alternately, useful hot melt adhesive compositions also may optionally include a plasticizer. If desired, the plasticizer may be included in amounts e.g. up to 60 weight percent, or alternately up to 35 weight percent, based on the total weight of the hot melt adhesive composition. Examples of suitable plasticizers include e.g. oils such as paraffinic process oils.

The hot melt adhesive composition suitable according to the present invention may include further additives commonly used in hot melt adhesives. For example, components can be added to modify the tack, color, odor, etc., of a hot melt adhesive. Additives such as antioxidants, for example, hindered phenolics (for example, Irganox® 1010, Irganox® 1076, all BASF, or Vulkanox BHT, Lanxess), phosphites (for example, Irgafos® 168, BASF), Evernox® 10, Irganox® PS800 from BASF, or any mixtures thereof, antiblock additives, pigments, and fillers, can also be included in the formulations. It is generally preferred that the additives should be relatively inert and have negligible effects upon the properties contributed by the at least one polymer, tackifying agent, and wax.

Additives may be generally used in small amounts, typically less than 10 weight %, preferably less than or up to 5 weight %, or even up to 3 weight %. One or more antioxidants are typically present in an amount of less than 2 weight %, preferably less than 1 weight %. Combinations of at least two different antioxidants are preferred, particularly preferred three different antioxidants in combination, to impart color stability. Antioxidants are specifically preferred ingredients to ensure thermal stability of the adhesives at high application temperatures of at least about 190° C., to avoid color changes such as yellowing, avoidance of which is typically desired for aesthetic reasons.

The hot melt adhesive composition useful according to the present invention may in some embodiments have a Brookfield viscosity at 190° C. of e.g. 200 to 13000 mPas.

Although the present invention can be put into practice by foaming any hot melt adhesive, a more specific hot melt adhesive employed for foaming in accordance with the invention is described in detail in the following. It should be noted, however, that the present invention is not limited to the preferred hot melt adhesive compositions described in the following.

Detailed Description of a Preferred Hot Melt Adhesive Composition

In an illustrative preferred embodiment, a suitable the hot melt adhesive composition used in the form of a foam in accordance with the present invention comprises:

a) from about 35 to about 60 weight percent of at least one homogenous linear or substantially linear interpolymer of ethylene and α-olefin:

b) from about 5 to about 25 weight percent of at least one block copolymer;

c) from about 25 to about 45 weight percent of at least one tackifying resin; and d) less than 10 weight percent of at least one wax;

wherein the sum of components a), b) and c) amounts to at least 85 weight percent of the total adhesive composition, and wherein the composition has a Brookfield viscosity at a temperature of 190° C. in the range from about 7,000 to about 12,000 mPa·s.

Interpolymers

The hot melt adhesive composition according to the illustrative preferred embodiment comprises at least one homogeneous ethylene/alpha-olefin interpolymer which is an interpolymer of ethylene and at least one $C_3$-$C_{10}$ alpha-olefin. The term "interpolymer" is used herein to indicate a copolymer, or a terpolymer, or a higher order polymer. That is, at least one other comonomer is polymerized with ethylene to make the interpolymer.

Homogeneous ethylene/alpha-olefin interpolymers differ from amorphous polyolefins also described as amorphous polyalphaolefins (APAO), with regard to homogeneity, molecular weight distribution ($M_w/M_n$), as well as comonomer (alpha-olefin) content. Amorphous polyolefins are homopolymers, copolymers and terpolymers of $C_2$-$C_8$ alpha-olefins which are typically polymerized by means of processes which employ Ziegler-Natta catalysts, resulting in a relatively broad molecular weight distribution, typically greater than 4. In contrast, the homogeneous ethylene/alpha-olefin interpolymers in the adhesive composition according to the illustrative preferred embodiment are characterized as having a narrow molecular weight distribution. The homogeneous ethylene/alpha-olefins have a $M_w/M_n$ of less than 4, preferably less than 3, more preferably from 1.5 to 2.5, even more preferably from 1.8 to 2.2, and most preferably about 2.0. Homogeneous ethylene/alpha-olefins useful in the illustrative preferred embodiment can be produced by use of constrained geometry catalysis (e.g. metallocene catalysis), or alternately by any other catalyst that results in the desired molecular weight distribution. Further, whereas amorphous polyolefins produced from Ziegler-Natta catalysis typically have an alpha-olefin content greater than 50 weight %, homogeneous ethylene/alpha-olefin interpolymers useful in the illustrative preferred embodiment are predominantly ethylene, having a greater ethylene content than comonomer content.

It is also noted that substantially linear interpolymers useful in the illustrative preferred embodiment differ from low density polyethylene prepared in a high pressure process. In one regard, whereas low density polyethylene is an ethylene homopolymer having a density from about 0.900 to about 0.935 g/cm$^3$, the homogeneous linear and substantially linear interpolymers useful in the illustrative preferred embodiment typically require the presence of a comonomer to reduce the density.

The homogeneous ethylene/alpha-olefin interpolymer usable in the illustrative preferred embodiment is a homogeneous linear or substantially linear ethylene/alpha-olefin interpolymer. By the term "homogeneous", it is meant that any comonomer is randomly distributed within a given interpolymer molecule and substantially all of the interpolymer molecules have the same ethylene/comonomer ratio within that interpolymer. The melting peak of homogeneous linear and substantially linear ethylene polymers, as obtained using differential scanning calorimetry, will broaden as the density decreases and/or as the number average molecular weight decreases. However, unlike heterogeneous polymers, when a homogeneous polymer, prepared in a solution polymerization process, has a melting peak greater than 115° C. (such as is the case of polymers having a density greater than about 0.940 g/cm$^3$), it does not additionally have a distinct lower temperature melting peak.

Substantially linear ethylene interpolymers are homogeneous interpolymers typically having long chain branching. The long chain branches of substantially linear ethylene interpolymers typically have the same comonomer distribution as the interpolymer backbone and can be as long as about the same length as the length of the interpolymer backbone. When a substantially linear ethylene/alpha-olefin interpolymer is employed in the practice of the illustrative preferred embodiment, such interpolymer will be characterized as having an interpolymer backbone substituted with from 0.01 to 3 long chain branches per 1000 carbons. Methods for determining the amount of long chain branching present, both qualitatively and quantitatively, are known in the art.

The homogeneous ethylene/alpha-olefin interpolymer is an interpolymer of ethylene with at least one comonomer selected from the group consisting of $C_3$-$C_{10}$ alpha-olefins. Exemplary $C_3$-$C_{10}$ alpha-olefins include propylene, isobutylene, 1-butene, 1-hexene, 4-methyl-1-pentene, 1-heptene, and 1-octene. Preferred alpha-olefins include 1-butene, 1-hexene, 4-methyl-1-pentene, 1-heptene, and 1-octene, more preferably 1-hexene and 1-octene, particularly 1-octene.

The molecular weight of the homogeneous ethylene/alpha-olefin interpolymer will be selected on the basis of the desired performance attributes of the adhesive formulation. Typically, the homogeneous ethylene/alpha-olefin interpolymer will have a number average molecular weight of at least 800 grams/mole, preferably at least 1,300 and no more than 100,000 g/mole. Ultra low molecular weight homogeneous ethylene/alpha-olefin interpolymers are considered to have a number average molecular weight of less than about 12,000 g/mole, typically from about 8,000 to about 12,000 g/mole.

In the composition of the illustrative preferred embodiment it is particularly preferred to use at least one homogeneous linear or substantially linear interpolymer of ethylene and 1-octene, preferably having a number average molecular weight from about 9,000 to about 12,000 g/mole.

The hot melt adhesive compositions of the illustrative preferred embodiment may include homogeneous ethylene/alpha-olefin interpolymers typically having a melt index or melt flow index of greater than about 0.1 g/10 min, more typically greater than about 5 g/10 min, preferably greater than about 30 g/10 min, more preferably greater than about 50 g/10 min, even more preferably greater than about 100 g/10 min, even more preferably greater than about 200 g/10 min and preferably the melt index ranges from about 300 g/10 min to about 1500 g/10 min and most preferably the melt index ranges from about 500 g/10 min to about 1000 g/10 min Further, in some instances the melt index can range as high as 4000 g/10 min Melt (flow) indices as described herein are determined by the procedure of ASTM-D-1238, 190° C. 2.16 kg load, if not explicitly stated otherwise.

The melt index inversely relates to the molten viscosity. The viscosity at 190° C. of the hot melt adhesives of the illustrative preferred embodiment ranges from about 7,000 mPa·s (cP) to about 12,000 mPa·s (cP), preferably from about 8,000 mPa·s (cP) to about 11,000 mPa·s (cP), and more preferably from about 8,500 mPa·s (cP) to about 10,000 mPa·s (cP). Viscosities as described herein are determined by a standard Brookfield viscometer, spindle 27, at the temperature given, if not explicitly stated otherwise. The viscosity at 350° F. (177° C.) of the hot melt adhesives of the illustrative preferred embodiment ranges from about 10,000 mPa·s (cP) to about 20,000 mPa·s (cP), preferably from about 12,000 mPa·s (cP) to about 16,000 mPa·s (cP), and more preferably from about 13,000 mPa·s (cP) to about 14,000 mPa·s (cP).

The density of the homogeneous ethylene/alpha-olefin interpolymer will be selected on the basis of the desired performance attributes of the adhesive formulation. Typically however, the homogeneous ethylene/alpha-olefin interpolymer will have a density of at least about 0.850 g/cm$^3$, preferably at least about 0.860 g/cm$^3$, and more preferably at least about 0.870 g/cm$^3$. For the majority of the preferred compositions for targeted adhesive applications, the homogeneous ethylene/alpha-olefin interpolymer will have a density of no more than about 0.965 g/cm$^3$, preferably no more than about 0.900 g/cm$^3$, more preferably no more than about 0.890 g/cm$^3$, and even more preferably no more than about 0.885 g/cm$^3$, and most preferably no more than about 0.880 g/cm$^3$. Specifically preferred, the at least one homogenous linear or substantially linear interpolymer of ethylene and 1-octene has a density of from about 0.860 to about 0.890 g/cm$^3$.

The hot melt adhesive composition of the illustrative preferred embodiment typically includes rather high amounts of the at least one homogeneous ethylene/alpha-olefin interpolymer. The homogeneous ethylene/alpha-olefin interpolymer will be present in the adhesive composition of the illustrative preferred embodiment in an amount of about 35 weight % and up to about 60 weight %, and preferably about 40 weight % to about 50 weight %, most preferably about 42 to about 48 weight %.

The adhesive composition comprises either a single homogeneous ethylene/alpha-olefin interpolymer or a blend of two or more interpolymers. In instances when a single homogeneous ethylene/alpha-olefin interpolymer is employed, the interpolymer will preferably have a density ranging from about 0.860 g/cm$^3$ to 0.890 g/cm$^3$ and a melt index from about 500 g/10 min to about 1000 g/10 min. In the case of homogeneous ethylene/alpha-olefin interpolymer blends, the density of the interpolymer blend will preferably possess the targeted density and melt index. However, the individual interpolymers comprised in the blend may have a density and/or melt index outside of the specified range.

When employing two or more homogeneous ethylene/alpha-olefin interpolymers, the first and second interpolymer will differ from each other with respect to the type of comonomer and/or the molecular weight or melt index, and/or the density, and/or the molecular weight distribution. Accordingly, the first and second interpolymer may differ in number average molecular weight by at least 5000, preferably at least 10,000, and more preferably at least 20,000. In addition or in the alternative, the first and second interpolymers may differ in density by at least 0.005 g/cm$^3$, preferably by at least 0.01 g/cm$^3$.

In preferred embodiments, the at least one homogenous linear or substantially linear interpolymer of ethylene and alpha-olefin comprises a substantially linear interpolymer of ethylene and 1-octene which is grafted with a dicarboxylic acid anhydride, preferably a maleic anhydride grafted ethylene/1-octene interpolymer.

When employing two or more ethylene/alpha-olefin interpolymers, the hot melt adhesive composition includes a blend of at least one homogenous linear or substantially linear interpolymer of ethylene and alpha-olefin and a substantially linear interpolymer of ethylene and 1-octene which is grafted with a dicarboxylic acid anhydride, preferably a maleic anhydride grafted ethylene/1-octene interpolymer. The polymers may be used in a weight ratio of 3:1 to 1:3, preferably 2:1 to 1:2, and most preferably of 1:1. Particularly preferred for use in the illustrative preferred embodiment as the at least one homogenous linear or substantially linear interpolymer of ethylene and alpha-olefin is a blend of a substantially linear interpolymer of ethylene and 1-octene and a maleic anhydride grafted ethylene/1-octene interpolymer in a weight ratio of 1:1.

Homogeneous linear ethylene/alpha-olefin interpolymers are currently available from Mitsui Petrochemical Company under the trade name "Tafmer" and from Exxon Chemical Company under the trade name "Exact". Substantially linear ethylene/alpha-olefin interpolymers are available from the Dow Chemical Company as Affinity® polyolefin plastomers and elastomers, and Engages® polyolefin elastomers. Specifically preferred for use in the illustrative preferred embodiment are for example Affinity® GA 1875, GA 1900, GA 1950 and GA 1000R. Affinity® GA 1000R is a preferred maleic anhydride grafted ethylene/l-octene interpolymer.

Block Copolymer

Suitable block copolymers for use in the illustrative preferred embodiment include those having at least one A block that includes a vinyl aromatic compound and at least one B block that includes an elastomeric conjugated diene, including hydrogenated or unhydrogenated conjugated dienes, and combinations thereof. The A blocks and the B blocks may bind to one another in any manner of binding such that the resulting copolymer is random, block, straight-chained, branched, radial, or a combination thereof. The block copolymer can exhibit any form including, e.g., linear A-B block, linear A-B-A block, linear A-(B-A)$_n$-B multi-block, and radial (A-B)$_n$-Y block where Y is a multivalent compound and n is an integer of at least 3, tetrablock copolymer, e.g., A-B-A-B, and pentablock copolymers having a structure of A-B-A-B-A. The adhesive composition can include blends of at least two different block copolymers.

Useful vinyl aromatic compounds include, e.g., styrene, alpha-methylstyrene, o-methylstyrene, m-methylstyrene, p-methylstyrene, p-tert-butylstyrene, 2,4-dimethylstyrene, 2,4,6-trimethylstyrene, diphenylethylenes including stilbene, vinyl naphthalene, vinylanthracene, vinyltoluene (a mixture of meta- and para-isomers of methylstyrene), vinylxylene, and combinations thereof. Suitable conjugated dienes include, e.g., butadiene (e.g., polybutadiene), isoprene (e.g., polyisoprene), 2,3-dimethyl-1,3-butadiene, 1,3-pentadiene, 1,3-hexadiene, and combinations thereof, and hydrogenated versions thereof including, e.g., ethylene, propylene, butylene and combinations thereof.

Useful block copolymers include polyvinyl aromatic in an amount between about 0 weight % and about 50 weight %, between about 5 weight % and about 50 weight %, between about 15 weight % and about 35 weight %, or even between about 20 weight % and about 30 weight %. Suitable block copolymers have a melt flow index between about 3 g/10 min and about 50 g/10 min, or between about 5 g/10 min and about 20 g/10 min, as determined by ASTM-D 1238.

The A block can also include a small amount (e.g. no greater than 10 weight % based on the weight of the A block) of a structural unit derived from unsaturated monomers other than the vinyl aromatic compounds including, e.g., 1-butene, pentene, hexene, butadiene, isoprene, methyl vinyl ether, methyl methacrylate, vinyl acetate and combinations thereof. The B block can also include a small amount (e.g., no greater than 10 weight % based on the amount of the B block) of a structural unit derived from unsaturated monomers other than the conjugated diene including, e.g., 1-butene, 1-pentene, 1-hexene, methyl vinyl ether, styrene, methyl methacrylate, and combinations thereof.

Useful block copolymers include or may be based on, e.g., random styrene-butadiene polymers, styrene-butadiene block copolymers, multiarmed and repeating styrene-butadiene copolymers, styrene-butadiene-styrene block copolymers, styrene-isoprene block copolymers, styrene-isoprene-styrene block copolymers, styrene-multiarmed styrene-isoprene (SI)$_x$ block copolymers, styrene-ethylene-butylene-styrene block copolymers (SEBS), styrene-isobutylene-styrene block copolymers (SIS), styrene-ethylene-ethylene-propylene-styrene block copolymers, styrene-ethylene-propylene-styrene block copolymers (SEPS) and combinations thereof.

Block copolymers for use in the illustrative preferred embodiment are commercially available under the KRATON® D and G series of trade designations from Shell Chemical Company (Houston, Tex.) including, e.g., KRATON D 1163 and 1117 and KRATON G 1652, 1657 and 1726, EUROPRENE® Sol T trade designation from EniChem (Houston, Tex.), SEPTON® trade designation from Septon Company of America (Pasadena, Tex.) including SEPTON® S 1001 styrene-ethylene-propylene-styrene block copolymer, and SEPTON® 4030, 4033, 4044, 4055 and 4077 block copolymers, and VECTOR® series of trade designations from Dexco (Houston, Tex.) including VECTOR® 4211 styrene-isoprene-styrene block copolymer. Preferred examples of styrene-isoprene (SI) or styrene-isoprene-styrene (SIS) include KRATON D1117 and KRATON D 1161 NS, available from Kraton Polymers, US, VECTOR 4114A and VECTOR 4411 A from Dexco Polymers, USA. Also suitable as the block copolymer component in the illustrative preferred embodiment are based thermoplastic elastomers such as from the Globalprene series, available from LCY Chemical Corp. Examples are Globalprene SEBS 9550, 9551, 9552, 9553, or 9554.

Preferably, the at least one block copolymer in the adhesive composition of the illustrative preferred embodiment is selected from at least one of a diblock styrenic block copolymer, or a triblock styrenic block copolymer, or a combination of the two preferably styrene-ethylene/butylene-styrene (SEBS) or styrene-ethylene/propylene-styrene (SEPS). Particularly preferred are such triblock copolymers having a low styrenic content, such as below 20 weight %, preferably 10 to 15 weight %.

The at least one block copolymer is present in the adhesive composition in an amount between about 5 weight % and about 25 weight %, between about 10 weight % and about 20 weight %, between about 10 weight % and about 15 weight %, or even between about 12 weight % and about 14 weight %.

In a preferred embodiment the block copolymers have a melt flow index between about 0.1 g/10 min and about 4,000 g/10 min, preferably between about 10 g/10 min and about 60 g/10 min and most preferably between about 20 g/10 min and about 40 g/10 min, most preferred between about 20 g/10 min and about 25 g/10 min. A particularly preferred polymer such as styrene-ethylene/butylene-styrene (SEBS) has a density between about 0.8 g/cm$^3$ and about 1.0 g/cm$^3$, preferably between about 0.88 g/cm$^3$ and about 0.94 g/cm$^3$.

Tackifiers

In addition to the homogeneous ethylene/alpha-olefin interpolymer and block copolymer, the adhesive compositions of the illustrative preferred embodiment comprise one or more tackifiers. As used herein, the term "tackifier" or "tackifying resin" means any of the compositions described below which are useful to impart tack to the hot melt adhesive composition. ASTM D-1878-61T defines tack as "the property of a material which enables it to form a bond of measurable strength immediately on contact with another surface".

The adhesive of the illustrative preferred embodiment comprises from 25 weight % to about 45 weight % of a tackifying resin, preferably from 30 weight % to about 40 weight % tackifier, and most preferably from about 32 weight % to about 38 weight % tackifier. The tackifying resin can be at least partially hydrogenated in order to improve stability for bulk handling. Useful tackifying agents have Ring and Ball softening point of less than about 140° C., less than about 130° C., less than about 100° C., or even less than about 90° C.

The tackifying resin can be liquid or solid at room temperature. Suitable classes of tackifying resins include, e.g., aromatic, aliphatic and cycloaliphatic hydrocarbon resins, mixed aromatic and aliphatic modified hydrocarbon resins, aromatic modified aliphatic hydrocarbon resins, and hydrogenated versions thereof; terpenes, modified terpenes and hydrogenated versions thereof; natural rosins, modified rosins, rosin esters, and hydrogenated versions thereof; low molecular weight polylactic acid; and combinations thereof. Examples of useful natural and modified rosins include gum rosin, wood rosin, tall oil rosin, distilled rosin, hydrogenated rosin, dimerized rosin and polymerized rosin. Examples of useful rosin esters include e.g., glycerol esters of pale wood rosin, glycerol esters of hydrogenated rosin, glycerol esters of polymerized rosin, pentaerythritol esters of natural and modified rosins including pentaerythritol esters of pale wood rosin, pentaerythritol esters of hydrogenated rosin, pentaerythritol esters of tall oil rosin, and phenolic-modified pentaerythritol esters of rosin. Specifically preferred tackifying resins include cycloaliphatic hydrocarbon compounds, preferably hydrogenated dicyclopentadiene hydrocarbon resins.

Examples of useful polyterpene tackifying resins include polyterpene resins having a softening point, as determined by DIN EN 1427 (Ring and Ball) of from about 10° C. to about 180° C., hydrogenated polyterpene resins, and copolymers and terpolymers of natural terpenes (e.g. styrene-terpene, alpha-methyl styrene-terpene and vinyl toluene-terpene). Examples of useful aliphatic and cycloaliphatic petroleum hydrocarbon resins include aliphatic and cycloaliphatic petroleum hydrocarbon resins having Ring and Ball softening points of from about 10° C. to about 140° C. (e.g., branched and unbranched C5 resins, C9 resins, and C10 resins) and the hydrogenated derivatives thereof.

Useful tackifying resins are commercially available under a variety of trade designations including, e.g., the ESCOREZ series of trade designations from Exxon Mobil Chemical Company (Houston, Tex.) including ESCOREZ 1310 LC, ESCOREZ 5400, ESCOREZ 5415, ESCOREZ 5600, ESCOREZ 5615, and ESCOREZ 5690, the EASTOTAC series of trade designations from Eastman Chemical (Kingsport, Tenn.) including EASTOTAC H-100R, EASTOTAC H-100L, and EASTOTAC H130W, the WINGTACK series of trade designations from Cray Valley HSC (Exton, Pa.) including WINGTACK 86, WINGTACK EXTRA, and WINGTACK 95, the PICCOTAC and KRISTALEX series of trade designations from Eastman Chemical Company (Kingsport, Tenn.) including, e.g., PICCOTAC 8095 and KRISTALEX 3100, ARKON M-100 of trade designations from Arakawa Europe GmbH, Germany, SUKOREZ SU-90, SUKOREZ SU-100, or SUKOREZ SU-120 of trade designations from Kolon Industries Inc., Korea, and SYLVARES 7115 and SYLVARES SA 140 of trade designations from Arizona Chemical, USA.

Preferably, the hot melt adhesive composition of the illustrative preferred embodiment comprises at least one tackifying resin with a Ring & Ball softening point of about 100° C., and/or at least one tackifying resin with a Ring & Ball softening point of about 90° C., preferably at least one thereof, most preferably both being selected from cycloaliphatic hydrocarbon compounds, preferably hydrogenated dicyclopentadiene hydrocarbon resins.

If blends or mixtures of such tackifiers are used, it is preferred that at least one tackifying resin is included that has a Ring & Ball softening point of about 90° C. or less. Blends of at least two tackifying resins may include at least one tackifying resin having Ring & Ball softening point of about 90° C. or less, and at least one tackifying resin having a Ring & Ball softening point of about 100° C. or more, in a weight ratio from 1:3 to 3:1, preferably a weight ratio from 1:2 to 2:1, most preferably 1:1. Specifically preferred are tackifying resins both being selected from hydrogenated dicyclopentadiene hydrocarbon resins.

Waxes

Waxes are commonly used to modify the viscosity and reduce tack. Waxes are included in the adhesive compositions of the illustrative preferred embodiment in low amounts, at concentrations less than 10 weight %, preferably at concentrations ranging from about 1 weight % to about 10 weight %, more preferably in amounts ranging from about 2 weight % to about 8 weight %, and most preferably from about 3 weight % to about 6 weight %.

Waxes useful in the adhesives of the illustrative preferred embodiment include paraffin waxes, microcrystalline waxes, Fischer-Tropsch waxes, oxidized Fischer-Tropsch waxes, polyethylene and by-products of polyethylene wherein $M_w$ is less than 3000, and functionalized waxes such as hydroxy stearamide and fatty amide waxes. The terminology "synthetic high melting point" (HMP) waxes includes high density low molecular weight polyethylene waxes, by-product polyethylene waxes, and Fischer-Tropsch waxes.

Also suitable are ultra-low molecular weight ethylene/alpha-olefin interpolymers prepared using a constrained geometry (e.g. metallocene) catalyst, which may be referred to as homogeneous waxes. Homogeneous waxes, in contrast to paraffinic waxes and crystalline ethylene homopolymer or interpolymer waxes, will have a Mw/Mn from 1.5 to 2.5, preferably from 1.8 to 2.2.

Homogeneous waxes will be either ethylene homopolymers or interpolymers of ethylene and a $C_3$-$C_{10}$ alpha-olefin. The homogeneous wax will have a number average molecular weight less than 6000, preferably less than 5000. Such homogeneous waxes will typically have a number average molecular weight of at least 800, preferably at least 1300.

Additives

The hot melt adhesive composition according to the illustrative preferred embodiment also may include typical additives as already described in detail above.

Furthermore, it has been found that the use of ethylene/α-olefin interpolymers the glass transition temperature and degree of crystallinity are sufficiently lowered. It is believed that these ethylene/α-olefin interpolymers are "internally plasticized" by their relatively long α-olefin/octene side chains, so that the addition of separate plasticizers is not required. Also, the addition of, e.g. solid plasticizers would interfere with the required high viscosity at application temperature, to avoid liquid adhesive running down the container. Therefore, also solid plasticizers as used in prior art adhesives are preferably avoided.

Thus, preferably the hot melt adhesive compositions of the illustrative preferred embodiment are also substantially free of solid plasticizers.

Furthermore, if desired, performance additives may be used in small amounts, typically less than 15 weight %, preferably less than 10 weight %, more preferably less than or up to 5 weight %.

Such performance additives may serve to improve tack on specific substrates, low temperature adhesion and flexibility, high temperature tolerance, etc., and can be selected from metallocene polyolefines such as polypropylene, for example Licocene PP MA 6252 GR, from Clariant, which is a maleic anhydride grafted metallocene polypropylene; or olefin block copolymer such as Infuse 9817, available from DowChemicals; or copolymers from ethylene and acrylic acid, e.g. A-C 5120 from Honeywell; ethylene/ethyl acrylate/maleic acid anhydride terpolymer, e.g. Lotader 8200 from Arkema; copolymers from ethylene and maleic anhydride such as A-C 573 from Honeywell; or high density oxidized polyethylene e.g. A-C 392 from Honeywell.

Some hot melt adhesive compositions preferred in the context of the illustrative preferred embodiment are described below.

Illustrative Preferred Compositions

All weight percentages refer to total weight of compositions.

A preferred hot melt adhesive composition of the illustrative preferred embodiment comprises:
a) from about 40 to about 50 weight percent of at least one homogenous linear or substantially linear interpolymer of ethylene and α-olefin;
b) from about 5 to about 25 weight percent of at least one block copolymer;
c) from about 25 to about 45 weight percent of at least one tackifying resin; and
d) less than 10 weight percent of at least one wax; wherein the sum of components a), b) and c) amounts to at least 85, preferably at least 90, and more preferably at least 95 weight percent of the total adhesive composition, and wherein the composition has a Brookfield viscosity at a temperature of 190° C. in the range from about 7.000 to about 12,000 mPa·s.

A further preferred hot melt adhesive composition of the illustrative preferred embodiment comprises:
a) from about 40 to about 50 weight percent of at least one homogenous linear or substantially linear interpolymer of ethylene and α-olefin:
b) from about 10 to about 15 weight percent of at least one block copolymer;
c) from about 25 to about 45 weight percent of at least one tackifying resin; and
d) less than 10 weight percent of at least one wax; wherein the sum of components a), b) and c) amounts to at least 85, preferably at least 90, and more preferably at least 95 weight percent of the total adhesive composition, and wherein the composition has a Brookfield viscosity at a temperature of 190° C. in the range from about 7,000 to about 12,000 mPa·s.

A further preferred hot melt adhesive composition of the illustrative preferred embodiment comprises:
a) from about 40 to about 50 weight percent of at least one homogenous linear or substantially linear interpolymer of ethylene and α-olefin;
b) from about 10 to about 15 weight percent of at least one block copolymer;
c) from about 30 to about 40 weight percent of at least one tackifying resin; and
d) less than 10 weight percent of at least one wax; wherein the sum of components a), b) and c) amounts to at least 85, preferably at least 90, and more preferably at least 95 weight percent of the total adhesive composition, and wherein the composition has a Brookfield viscosity at a temperature of 190° C. in the range from about 7,000 to about 12,000 mPa·s.

A further preferred hot melt adhesive composition of the illustrative preferred embodiment comprises:
a) from about 40 to about 50 weight percent of at least one homogenous linear or substantially linear interpolymer of ethylene and α-olefin;
b) from about 10 to about 15 weight percent of at least one block copolymer;
c) from about 30 to about 40 weight percent of at least one tackifying resin; and
d) from about 1 to 10 weight percent, preferably from about 3-6 weight percent of at least one wax; wherein the sum of components a), b) and c) amounts to at least 85, preferably at least 90, and more preferably at least 95 weight percent of the total adhesive composition, and wherein the composition has a Brookfield viscosity at a temperature of 190° C. in the range from about 7,000 to about 12,000 mPa·s.

A further preferred hot melt adhesive composition of the illustrative preferred embodiment comprises:
a) from about 35 to about 60 weight percent of at least one homogenous linear or substantially linear interpolymer of ethylene and α-olefin:
b) from about 10 to about 15 weight percent of at least one block copolymer;
c) from about 30 to about 40 weight percent of at least one tackifying resin; and
d) less than 10 weight percent of at least one wax; wherein the sum of components a), b) and c) amounts to at least 85, preferably at least 90, and more preferably at least 95 weight percent of the total adhesive composition, and wherein the composition has a Brookfield viscosity at a temperature of 190° C. in the range from about 7,000 to about 12,000 mPa·s.

A further preferred hot melt adhesive composition of the illustrative preferred embodiment comprises:
a) from about 35 to about 60 weight percent of at least one homogenous linear or substantially linear interpolymer of ethylene and α-olefin;

b) from about 10 to about 15 weight percent of at least one block copolymer;

c) from about 30 to about 40 weight percent of at least one tackifying resin; and d) from about 1 to 10 weight percent, preferably from about 3-6 weight percent of at least one wax; wherein the sum of components a), b) and c) amounts to at least 85, preferably at least 90, and more preferably at least 95 weight percent of the total adhesive composition, and wherein the composition has a Brookfield viscosity at a temperature of 190° C. in the range from about 7,000 to about 12,000 mPa·s.

In the above hot melt adhesive compositions according to the illustrative preferred embodiment, it is further preferred that the at least one homogenous linear or substantially linear interpolymer of ethylene and α-olefin is grafted with a dicarboxylic acid anhydride, preferably a maleic anhydride grafted ethylene/1-octene interpolymer.

In addition, it is further preferred according to the illustrative preferred embodiment that the at least one homogenous linear or substantially linear interpolymer of ethylene and α-olefin has a melt flow index in the range of about 300 to about 1,500 g/10 min, preferably of about 500 to about 1,000 g/10 min.

It is further preferred according to the illustrative preferred embodiment that the at least one homogenous linear or substantially linear interpolymer of ethylene and α-olefin has a density of from about 0.860 to about 0.890 g/cm$^3$.

It is further preferred according to the illustrative preferred embodiment that the hot melt adhesive composition comprises a mixture of at least two different homogenous linear or substantially linear interpolymers of ethylene and α-olefin.

It is further preferred according to the illustrative preferred embodiment that the hot melt adhesive composition comprises from about 40 to about 50, preferably from about 42 to about 48 weight percent of the at least one homogenous linear or substantially linear interpolymer of ethylene and α-olefin.

It is further preferred according to the illustrative preferred embodiment that the α-olefin is 1-octene.

It is further preferred according to the illustrative preferred embodiment that the hot melt adhesive composition comprises from about 10 to about 15 weight percent of the at least one block copolymer.

It is further preferred according to the illustrative preferred embodiment that the hot melt adhesive composition comprises from about 30 to about 40 weight percent of the at least one tackifying resin.

It is further preferred according to the illustrative preferred embodiment that the at least one tackifying resin has a Ring & Ball softening point of about 100° C.

It is further preferred according to the illustrative preferred embodiment that the at least one tackifying resin has a Ring & Ball softening point of about 90° C.

It is further preferred according to the illustrative preferred embodiment that the hot melt adhesive composition includes a mixture of at least two resins having different Ring & Ball softening points, wherein preferably a first tackifying resin has a Ring & Ball softening point of about 100° C., and a second tackifying resin has a Ring & Ball softening point of about 90° C.

It is further preferred according to the illustrative preferred embodiment that the at least one tackifying resin is selected from cycloaliphatic hydrocarbon compounds, preferably hydrogenated dicyclopentadiene hydrocarbon resins.

It is further preferred according to the illustrative preferred embodiment that the sum of components a), b) and c) amounts to at least 90 weight percent, more preferably at least 95 weight percent of the total adhesive composition.

It is further preferred according to the illustrative preferred embodiment that the wax is selected from paraffin waxes, microcrystalline waxes, Fischer-Tropsch waxes, synthetic high melting point waxes (HMP), specifically hydrogenated microwaxes.

It is further preferred according to the illustrative preferred embodiment that the hot melt adhesive composition further comprises at least one additive selected from antioxidants, antiblock additives, pigments, and fillers.

It is further preferred according to the illustrative preferred embodiment that the hot melt adhesive composition is free of plasticizer.

It is further preferred according to the illustrative preferred embodiment that the hot melt adhesive composition consists of:

a) from about 35 to about 60 weight percent of at least one homogenous linear or substantially linear interpolymer of ethylene and 1-octene;

b) from about 5 to about 25 weight percent of at least one block copolymer;

c) from about 25 to about 45 weight percent of at least one tackifying resin; and d) from about 1 to 10 weight percent of at least one wax; and e) at least one antioxidant.

wherein the sum of all components amounts to 100 percent, and wherein the composition has a Brookfield viscosity at a temperature of 190° C. in the range from about 7,000 to about 12,000 mPa·s.

It is further preferred according to the illustrative preferred embodiment that the hot melt adhesive composition consists of:

a) from about 40 to about 50 weight percent of at least one homogenous linear or substantially linear interpolymer of ethylene and 1-octene;

b) from about 10 to about 15 weight percent of at least one block copolymer;

c) from about 30 to about 40 weight percent of at least one tackifying resin; and d) from about 3 to about 6 weight percent of at least one wax; and e) at least one antioxidant.

wherein the sum of all components amounts to 100 percent, and wherein the composition has a Brookfield viscosity at a temperature of 190° C. in the range from about 7,000 to about 12,000 mPa·s.

EXAMPLES

In the context of the present invention, unless indicated otherwise, the melt flow index or simply melt index (MI) is determined in accordance with ASTM D 1238 at a standard temperature of 190° C. and at 2.16 kg load.

The viscosity is determined similar to method ASTM D-3236 as follows. The viscosity of a sample is determined using a Brookfield Laboratories DVH, DV-II, or DV-III Viscometer. The spindle used is a SC-27 hot melt spindle suitable for measuring viscosities in a range between about 100 mPa·s and about 4,000,000 mPa·s. The sample is placed in a pre-warmed measuring cell, which in turn is inserted into the heating element/container and is locked into place. The sample is heated until it is melted with additional sample being added until the melted sample is about 5 mm higher than the cylinder of the measuring spindle. The viscometer apparatus is lowered and the spindle is submerged into the sample. The viscometer is turned on and set to a shear rate that leads to a torque reading in the range of from 30% to 60%. Readings are taken every minute for about 15 minutes or until the values stabilize. The final reading can be obtained after 30 min and is recorded in mPa·s.

The molecular weight of all materials mentioned in this description, if not expressly stated otherwise, is determined by the method ASTM D 4001-93/2006.

The softening point is determined according to DIN EN 1427 (Ring and Ball) with the Ring and Ball instrument MC753 as summarized as follows. Two shouldered rings are heated to melt temperature and are placed onto a silicon-papered glass-plate and the melted substance is poured into the rings. After cooling, the excess materials were cut off and the samples were placed into the sample holder of the apparatus and the ball-centering guide with the balls is placed above the samples. A 600 ml NF beaker is filled with 500 ml glycerol and is placed on the heating plate of the MC 753 apparatus. The frame, which is ready for measurement with the shouldered rings, is placed into the beaker in such a way that it is centered on the pins. The temperature sensor is adjusted in the therefore designed opening in the frame and the MC 753 apparatus is activated by choosing the measuring point (keyboard 1-10, basic unit). After a certain pre-heating time, the program automatically runs with a heating rate of 5° C. per minute until the balls fall. The measurement is completed when both balls have fallen down and two temperatures are shown on the display.

Polymer density is determined according to method ASTM D 1505.

Adhesive density was determined as follows. One, 103.3 ml volume aluminum pan was filled with unfoamed adhesive and a second pan was filled with foamed adhesive. The weight of the adhesive in the pan was measured in grams. Density (grams/ml) was determined by dividing the weight of adhesive by the volume of the pan.

Materials:

The following materials were used in the below examples:

Affinity® GA 1950 is an ethylene/α-olefin interpolymer available from Dow having an MI of 500 g/10 min Block Copolymers:

Kraton G 1657, Kraton polymers, SEBS, (used in composition 1, and in admixture with Kraton G 1650 in composition 2 (composition 2 includes 3.5 weight percent Kraton G 1657 and 11.5 weight percent Kraton G 1650).

Kraton G 1650, Kraton polymers, SEBS, (used in admixture with Kraton G 1657 in composition 2)

SUKOREZ SU-90 is a tackifier available from Kolon industries based hydrogenated hydrocarbon resin and having a softening point of 90° C.

Escorez 5320 is a tackifier available from ExxonMobil based on cycloaliphatic hydrocarbon resin and having a softening point of 124° C.

Escorez 5400 is a tackifier available from ExxonMobil based on cycloaliphatic hydrocarbon resin and having a softening point of 100° C.

Regalite R 1010 is a hydrocarbon resin available from Eastman for multipart tackifier systems Waxes:
AC-8, Honeywell, PE wax
Microcrystalline wax HMP, Shell,
An admixture of AC-8 and HMP wax was used in composition 1

Illustrative Antioxidants Include:
IRGANOX PS 800, Ciba/BASF, dilaurylthiodipropionate
Evernox 10, Everspring Chemical Co., sterically hindered phenolic antioxidant
IRGANOX 1010, Ciba/BASF
Irgafos 168, BASF, tris(2,4-di-tert-butylphenyl)phosphite
Vulkanox BHT, Lanxess, 3,5-Di-tert-butyl-4-hydroxytoluol
Polybutene 10 (MW 950) is a polyolefin available from Kemat, BE (PIB 24)
Coextrudate R 604 is a rubber based, non-tacky material prepared in-house used as sheath material for enchasing adhesive
Paraffinic oil is a plasticizer known for use in adhesives, such as Ondina 941, Shell, used in composition 2

Hot melt adhesives were produced having the compositions shown in Table I below with the amounts given in weight percent.

TABLE 1

| Material | Composition 1 | Composition 2 |
|---|---|---|
| Affinity GA 1950 | 46.4 | — |
| SEBS block copolymer | 13.0 | 15.0 |
| SUKOREZ SU-90 | 13.5 | — |
| Escorez 5400 | 13.5 | — |
| Escorez 5320 | — | 53.2 |
| Regalite R 1010 | 8.5 | — |
| Coextrudate R 604 | — | 2.0 |
| Polybutene 10 | 1.5 | — |
| Wax | 3.0 | — |
| Paraffinic oil | — | 29.5 |
| Antioxidants | 0.6 | 0.3 |
| Total amount | 100 | 100 |
| Viscosity @ 190° C. [mPas] | 8700 | 900 |

The above adhesives were tested with regard to its suitability to bond six-packs of commercial 1.5 liter PET-bottles in foamed form according to the present invention compared with the same adhesive compositions in unfoamed form (comparative).

A hotmelt unit CompactAir available from BIT Nederland BV suitable for foaming hot melt adhesives was used to bond two 1.5 liter PET-bottles together. The same amount of adhesive was used for the example and comparative example. Two dots were applied to each bottle and then an adhesive to adhesive bond was formed. After one day the resulting bond was evaluated and a commercially available force gauge type PCE-FM200 digital was used to check the separation force. The testing was carried out by putting a plastic strip around one bottle, where the bottle is most contoured and fixing the other (i.e. second) bottle in place. The plastic strip is attached to a hook on the force gauge. Then the bottles are pulled apart and the maximum force required for separation displayed on the force gauge is recorded. Further conditions and results are described in the following Tables 2 and 3.

TABLE 2

| | Test results of composition 1 | | | |
|---|---|---|---|---|
| | Comparative Example 1 | Example 1 | Comparative example 2 | Example 2 |
| Adhesive temperature | 175° C. | | | |
| Adhesive condition | Unfoamed | Foamed | Unfoamed | Foamed |
| Pump ratio | 10.1/10.1 | 20.2/11.8 | 10.1/10.2 | 20.2/11.9 |

TABLE 2-continued

Test results of composition 1

|  | Comparative Example 1 | Example 1 | Comparative example 2 | Example 2 |
|---|---|---|---|---|
| Adhesive Density [g/ml] | NA | NA | NA | NA |
| Bottle condition | 5° C.; wet | | 23° C.; dry | |
| Application weight/dot [mg] | | 60 | | |
| 2 dots forming one bond | | Yes | | |
| Stress test after 24 h | | OK | | |
| Separation force | No separation | 145-175N | No separation | 145-180N |
| Bead application length [mm] | 12 | 8 | 12 | 8 |

TABLE 3

Test results of composition 2

|  | Comparative Example 3 | Example 3 | Comparative example 4 | Example 4 |
|---|---|---|---|---|
| Adhesive temperature | | 150° C. | | |
| Adhesive condition | Unfoamed | Foamed | Unfoamed | Foamed |
| Adhesive Density [g/ml] | 0.90 | 0.61 | 0.90 | 0.61 |
| Pump ratio | 15.3/15.3 | 18.6/10.8 | 15.3/15.4 | 18.6/10.8 |
| Bottle condition | 5° C.; wet | | 23° C.; dry | |
| Application weight/dot [mg] | | 60 | | |
| 2 dots forming one bond | | Yes | | |
| Stress test after 24 h | | OK | | |
| Separation force | 10-20N | 98N | 34-79N | 91N |
| Bead application length [mm] | 12 | 9 | 13 | 9 |

As shown in the above test results, a foamed hot melt adhesive in accordance with the present invention can be used to reliably bond containers such as bottles into packs. It is especially advantageous that even in case of cold, wet containers good results are achieved. By contrast, although the unfoamed hot melt adhesive did achieve a bond, in one case no separation of the containers was possible. Rather, the separation test resulted in destruction of the bottle. In another case, unfoamed adhesive did not provide the desired separation force, and thus did not provide a reliable bond, while foamed adhesive resulted in a reliable but yet separable bond. The application length is longer in the comparative examples because the unfoamed hot melt adhesive is flowing down on the bottle after application while this does not occur with the foamed adhesive. It is particularly surprising that a foamed hot melt adhesive according to the invention results on the one hand in a reliable bonding and on the other hand in easy separation, while the unfoamed adhesive either fails to provide a reliable bond or makes separation impossible. Furthermore, the adhesives according to composition 2 were removable after use, i.e. could be pulled easily from the bottle.

What is claimed is:

1. A container pack comprising a plurality of containers, wherein the containers are bonded to each other with a foamed hot melt adhesive composition, and wherein when two 1.5 liter PET containers are bonded together by applying two dots of the foamed hot melt adhesive composition of 60 mg per dot to each of the two 1.5 liter PET containers and then an adhesive to adhesive bond is formed, the foamed hot melt adhesive composition provides a maximum separation force of from about 80 N to about 200 N.

2. The container pack according to claim 1, wherein the containers are bottles or cans.

3. The container pack according to claim 1, wherein the containers are PET bottles.

4. The container pack according to claim 1, wherein the hot melt adhesive composition comprises:
   a) at least one polymer; and
   b) at least one tackifying resin.

5. The container pack according to claim 4, wherein the hot melt adhesive composition further comprises at least one wax.

6. The container pack according to claim 1, wherein the hot melt adhesive composition has a Brookfield viscosity at a temperature of 190° C. in the range from about 200 to about 13,000 mPa·s.

7. The container pack according to claim 4, wherein the at least one polymer comprises at least one block copolymer.

8. The container pack according of claim 4, further comprising a plasticizer.

9. The container pack according to claim 1, wherein the hot melt adhesive composition comprises:
   a) from about 35 to about 60 weight percent of at least one homogenous linear or substantially linear interpolymer of ethylene and α-olefin;
   b) from about 5 to about 25 weight percent of at least one block copolymer;
   c) from about 25 to about 45 weight percent of at least one tackifying resin; and
   d) less than 10 weight percent of at least one wax;
   wherein the sum of components a), b) and c) amounts to at least 85 weight percent of the total adhesive composition, and
   wherein the composition has a Brookfield viscosity at a temperature of 190° C. in the range from about 7,000 to about 12,000 mPa·s.

10. The container pack according to claim 7, wherein the at least one block copolymer is selected from the group consisting of styrene-ethylene/butylene-styrene (SEBS) and styrene-ethylene/propylene-styrene (SEPS).

11. The container pack according to claim 1, wherein the foamed hot melt adhesive composition has a density of from about 0.40 g/ml to about 0.80 g/ml.

12. The container pack according to claim 1, wherein the hot melt adhesive composition comprises:
   a) from 15% to 85% by weight of at least one block copolymer;
   b) from 5% to 60% by weight of at least one tackifying resin; and
   c) at least one liquid plasticizer.

13. The container pack according to claim 1, wherein when two 1.5 liter PET containers are bonded together by applying two dots of the foamed hot melt adhesive composition of 60 mg per dot to each of the two 1.5 liter PET containers and then an adhesive to adhesive bond is formed, the foamed hot melt adhesive composition provides a maximum separation force of from about 91 N to about 200 N.

14. The container pack according to claim 1, wherein when two 1.5 liter PET containers are bonded together by applying two dots of the foamed hot melt adhesive composition of 60 mg per dot to each of the two 1.5 liter PET containers and then an adhesive to adhesive bond is formed, the foamed hot melt adhesive composition provides a maximum separation force of from about 95 N to about 200 N.

15. The container pack according to claim 1, wherein when two 1.5 liter PET containers are bonded together by applying two dots of the foamed hot melt adhesive composition of 60 mg per dot to each of the two 1.5 liter PET containers and then an adhesive to adhesive bond is formed, the foamed hot melt adhesive composition provides a maximum separation force of from about 95 N to about 190 N.

16. A container pack comprising:
a plurality of containers bonded to each other with a foamed hot melt adhesive composition, the foamed hot melt adhesive composition providing a maximum separation force of from about 80 N to about 200 N when tested by applying two dots of foamed hot melt adhesive composition of 60 mg per dot to each of two 1.5 liter polyethylene terephthalate containers and bonding the containers together by contacting the two dots on a first of the two containers to the two corresponding dots on the other of the two containers to form an adhesive to adhesive bond, separating the bottles from one another, and measuring the maximum separation force with a force gauge.

17. The container pack of claim 16, wherein the foamed hot melt adhesive composition provides a maximum separation force of from about 91 N to about 200 N when tested by applying two dots of foamed hot melt adhesive composition of 60 mg per dot to each of two 1.5 liter polyethylene terephthalate containers and bonding the containers together by contacting the two dots on a first of the two containers to the two corresponding dots on the other of the two containers to form an adhesive to adhesive bond, separating the bottles from one another, and measuring the maximum separation force with a force gauge.

18. The container pack of claim 16, wherein the foamed hot melt adhesive composition provides a maximum separation force of from about 95 N to about 190 N when tested by applying two dots of foamed hot melt adhesive composition of 60 mg per dot to each of two 1.5 liter polyethylene terephthalate containers and bonding the containers together by contacting the two dots on a first of the two containers to the two corresponding dots on the other of the two containers to form an adhesive to adhesive bond, separating the bottles from one another, and measuring the maximum separation force with a force gauge.

19. The container pack of claim 16, wherein the containers are bottles or cans, formed from at least one of polyethylene terephthalate, a polyolefin, glass, and metal.

20. The container pack of claim 16, wherein each container of the plurality of containers is separable from the remaining containers with a separation force of from about 91 N to about 200 N.

* * * * *